Aug. 3, 1965  O. W. SUTTLES  3,197,962
AUXILIARY VEHICLE POWER SUPPLY
Filed Jan. 10, 1963
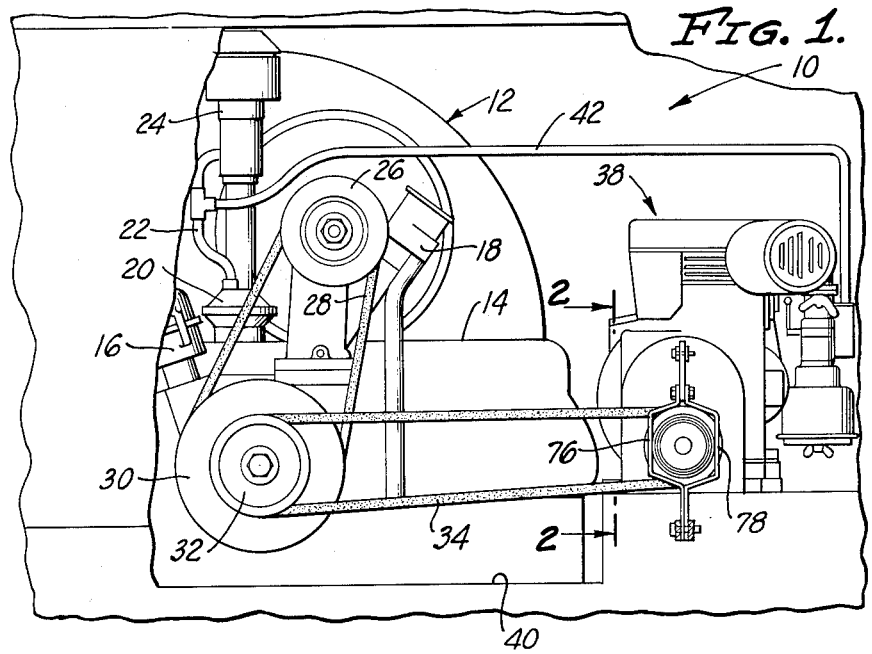
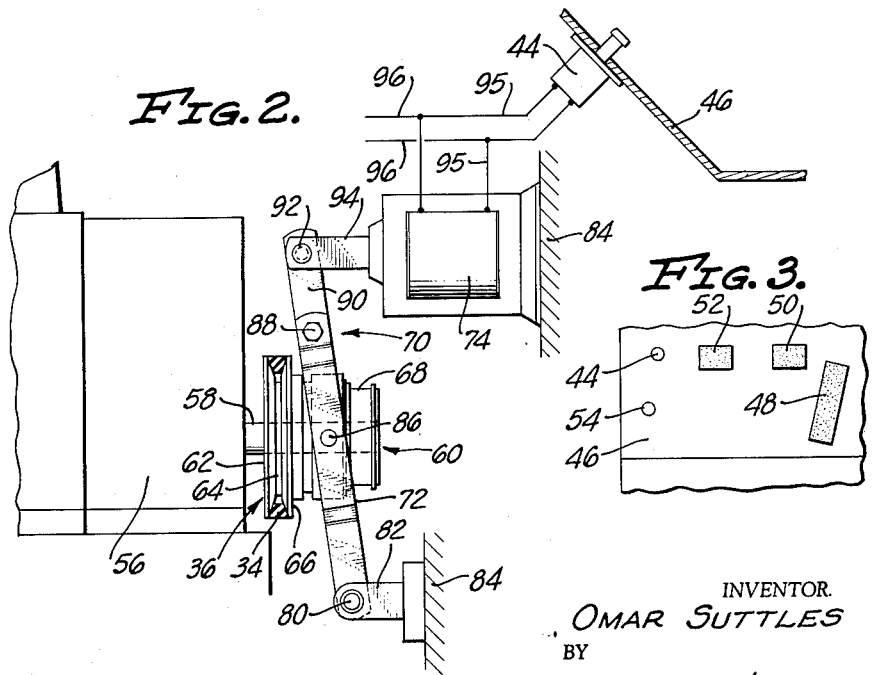
INVENTOR.
OMAR SUTTLES
BY
EDWARD D. O'BRIAN
ATTORNEY

United States Patent Office 3,197,962
Patented Aug. 3, 1965

3,197,962
AUXILIARY VEHICLE POWER SUPPLY
Omar W. Suttles, 11887 Douglas, Yucaipa, Calif.
Filed Jan. 10, 1963, Ser. No. 250,694
3 Claims. (Cl. 60—97)

This invention relates to an auxiliary power supply for a motor vehicle. More particularly, this invention is concerned with an auxiliary engine coupled to the drive shaft of the principal engine of a motor vehicle whereby the auxiliary engine can be operated to provide booster driving power to the principal engine when it is subjected to extreme power demands.

Motor vehicles frequently encounter driving situations that impose a power demand that the engine cannot satisfactorily supply. Such demands occur when the vehicle encounters steep or long grades or upon starting from a stop on a grade. Additionally, heavily loaded passenger cars or trucks are subject to such power demands under similar conditions. The need for extra power can be both inconvenient and in some cases dangerous.

Usually when situations which overtax the engine are encountered the only recourse the driver has is to let the vehicles struggle along at a lowered speed and when the speed becomes excessively slow down shift the transmission. We have all seen this happen to trucks and light weight economy type passenger automobiles. In such cases not only is the driver of the vehicle inconvenienced by the slowing down of the vehicle but he as well as the vehicles behind him may be endangered, especially if the underpowered vehicle is in the process of passing another car. In consideration of the above, it is obvious that the provision of means whereby extra power may be imparted to the drive shaft of an overtaxed engine would be highly desirable.

Accordingly it is an object of this invention to provide an auxiliary power supply for a motor vehicle.

It is another object of this invention to provide an auxiliary power supply for a motor vehicle that may selectively be coupled by an operator to the drive shaft of the principal engine of the vehicle.

Another object of this invention is the provision of a motor vehicle having a principal engine and an auxiliary engine which the operator may selectively couple to the drive shaft of the principal engine when the maximum power output of the principal engine is insufficient for convenient and/or safe operation of the vehicle.

It is another object of this invention to provide a motor vehicle auxiliary power supply system inexpensive of manufacture, efficient and dependable in operation, easily installed and removed from operating assembly, and simply maintained in operating condition.

The manner in which the advantages of the present invention are more particularly realized and its further objects and features achieved will become more clearly apparent from the subsequent detailed description of this invention taken with reference to the accompanying drawing in which:

FIG. 1 is an elevational view of a vehicular drive system including an auxiliary engine embodying this invention;

FIG. 2 is a cross-sectional view taken along line 2—2 in FIG. 1; and

FIG. 3 is a diagrammatical representation of the floor board layout of a vehicle embodying this invention.

The accompanying drawing is primarily intended so as to illustrate a preferred means of constructing a vehicle embodying an auxiliary power supply falling within the scope of this disclosure. It is to be understood that those skilled in the art to which this invention pertains may effect alterations in the embodiment of this invention disclosed by use of ordinary engineering skills with departure from the inventive concepts of the device of this invention. Also, further equivalent means can be employed in order to accomplish the operations and structural advantages of the invention.

As an aid toward understanding this invention it can be stated in essentially summary form that it involves a drive system for a motor vehicle which includes a conventional principal engine and a booster engine to supply extra power to the drive shaft of the principal engine to augment the effort of the principal engine when driving conditions demand maximum output power from the principal engine.

The invention can be more fully understood by referring to the accompanying drawings in which FIG. 1 shows an engine compartment 10 of a popular type economy automobile. The principal engine 12 of this automobile is of conventional four-cycle design and includes the usual motor block 14 mounting a distributor 16, oil intake 18, and a fuel pump assembly 20 which is connected by the gasoline feed line 22 to a carburetor 24 which is connected in the customary manner to the intake manifold of the engine 12. This principal engine 12 is modified to the extent that the normal one sheave pulley for driving the generator 26 by means of a V-belt 28 is replaced by a double sheave pulley 30 which includes a forward pulley sheave 32. This forward sheave 32 is connected by a V-belt 34 to the clutch controlled pulley assembly 36 of a booster or auxiliary engine 38.

The auxiliary engine 38 is also of conventional four-cycle design and is secured in a suitable fashion in the motor well 40 adjacent the principal engine 12. Since this engine 38 is of conventional design its various parts will not be identified in detail. However, it is to be noted that gasoline is provided for the engine through a branch line 42 connected directly to the gasoline line 22 of the principal engine 12.

During normal operation of the automobile the engine 38 is turned off. When an extreme power demand is made on the principal engine 12, however, the operator may start the booster engine by depressing a foot actuated switch 44. As shown in FIG. 3, this switch is located on the floor board 46 and is located to the left of the conventional gas pedal 48, brake pedal 50 and clutch pedal 52 and adjacent the light dimmer switch 54.

The output of the booster engine 38 is directed through a conventional direction changing gear box 56 whose output shaft 58 is connected to a clutch mechanism 60. The clutch mechanism 60 is formed by the drive pulley assembly 36 which includes a rear pulley plate 62 fixed to the output shaft, an idler bearing 64 positioned between the rear pulley plate 62 and a forward pulley plate 66 which in turn is attached to a reciprocating sleeve 68. The sleeve 68 is moved between the engaged position of the clutch mechanism shown in FIG. 2 and a disengaged position to the right with respect to the position shown in FIG. 2 by means of an actuating assembly 70. This actuating assembly 70 is formed by a pivoted lever arm 72 and a solenoid 74. The lever arm 72 comprises a yoke formed by a pair of members 76 and 78 which are pivotally connected at their lower ends by means of a bolt 80 to a bracket 82 suitably attached to the wall 84 of the engine compartment. Each of members 76 and 78 form a yoke in their central positions which is pivotally connected by means of pivot pins 86 to the sleeve 68, and are connected at their top ends by means of a bolt 88 to an arm 90 that is pivotally connected by means of a pivot pin 92 to the armature 94 of the solenoid 74 which in turn is attached by suitable means to the wall 84 of the engine compartment.

By virtue of the above arrangement the operator of a vehicle can add the power of the booster engine 38 to the output of the principal engine 12 whenever the principal engine becomes overloaded because of a steep incline or other described demands on the power output of the vehicle. This is accomplished by the operator depressing with his foot the switch 44 which provides ignition energy through the leads 96 to the engine 38 and actuation of the armature 94 by energization of the solenoid 74 through leads 95. Such actuation of the solenoid 74 will cause the armature 94 to be displaced to the left as viewed in FIG. 2 to force the belt 34 off the idler bearing 64 and into engagement between the pulley plates 62 and 66 to thereby apply the torque of the booster engine 38 to the forward pulley sheave 32. Whenever the power of the booster engine 38 is no longer needed the operation of this engine may be stopped by the operator removing his foot from the switch 44. Because of the "spring loaded" character of this switch this will break the circuit which provides ignition power to the engine 38, and will allow the solenoid 74 to automatically return to its initial position and will result in the clutch mechanism 60 being disengaged, uncoupling the auxiliary engine 38 from the principal engine 12.

An important factor with respect to preferred embodiment of this invention illustrated is the location of the switch 44. Although it may be located virtually anywhere it is preferred to locate it as described so that it is normally actuated by the foot which is normally employed to operate the clutch pedal 52. When it is located in this position there is virtually no change of the gears (not shown) connected to the principal engine 12 being shifted while the auxiliary engine 38 is operated.

In practice it has been found that a booster engine having 10 to 20 percent output with respect to the principal engine will provide sufficient power to sustain desired motion of the vehicle when such overloads are encountered.

From a consideration of the above it will be realized that a new and novel motor vehicle power supply system has been provided by this invention. It is to be realized that the principal engine may operate independently of the auxiliary or booster engine to accommodate normal power requirements from the vehicle. However, upon extreme overload conditions being imposed on the principal engine the auxiliary engine may be selectively actuated by the operator of the vehicle to assure satisfactory performance of the vehicle while subjected to such overloads.

It will be realized by those skilled in the art to which this invention pertains that by ordinary skills a variety of differently appearing motor vehicle power supply systems embodying an auxiliary engine may be designed and constructed which utilize the features of the invention as embodied in the above described example of the device of this invention. Accordingly, since the structures of this invention are susceptible to such modification the invention is to be considered as being limited only by the appended claims.

I claim:
1. A motor vehicle power supply system which comprises:
a principal engine from which ordinary driving power for a vehicle is derived, said principal engine having a principal output shaft connected for driving the vehicle, said principal engine having an auxiliary output shaft separate from its principal output shaft externally of said principal engine and connected to said principal output shaft within said principal engine;
an auxiliary engine associated with said principal engine, means to couple said auxiliary engine to said auxiliary output shaft of said principal engine so that said auxiliary engine can transmit power into said auxiliary output shaft of said principal engine to augument the vehicle driving power of said principal output of said principal engine; and
means connected to said means to couple arranged to be controlled by the operator of the vehicle for actuating said auxiliary engine so that said auxiliary engine transmits power to said auxiliary output of said principal engine.

2. The motor vehicle power supply system as defined in claim 1 wherein:
said auxiliary output shaft of said principal engine carries an external pulley, and said auxiliary engine has an output shaft and carries an auxiliary pulley on said output shaft connectable to be driven by said auxiliary engine; and
said means coupling said auxiliary engine and said auxiliary output of said principal engine comprises a belt in engagement with said pulleys.

3. The motor vehicle power supply system as defined in claim 2 wherein:
said pulley mounted on said output shaft of said auxiliary engine includes clutch means for clutching said belt with respect to said output of said auxiliary engine; and
said means controlled by the operator of the vehicle comprises clutch operating means for clutching said belt with respect to the output of said auxiliary engine.

References Cited by the Examiner
UNITED STATES PATENTS

| | | | |
|---|---|---|---|
| 875,851 | 1/08 | Russell | 180—54.1 |
| 1,006,938 | 10/11 | Harriss | 60—97 X |
| 1,026,677 | 5/12 | Keppel et al. | 60—97 X |
| 2,212,465 | 8/40 | Baldwin | 56—20 |
| 2,244,216 | 6/41 | Pieper | 180—54.1 |
| 2,317,324 | 4/43 | Wolf | 180—54.1 |
| 2,366,646 | 1/45 | Orr | 180—54.1 X |
| 2,396,803 | 3/46 | Ormsby | 60—97 |
| 2,595,336 | 5/52 | Corsentino | 60—97 X |

JULIUS E. WEST, *Primary Examiner.*

ROBERT R. BUNEVICH, *Examiner.*